United States Patent
Ocher (10) Patent No.: US 9,213,536 B2
(45) Date of Patent: Dec. 15, 2015

(54) METHOD AND ARCHITECTURE FOR AUTOMATIC INSTALLATION AND SELF-UPDATING OF CLIENT-SIDE COMPUTER SOFTWARE

(75) Inventor: Alexander Ocher, San Jose, CA (US)

(73) Assignee: Business Objects Software Ltd., Dublin (IE)

( * ) Notice: Subject to any disclaimer, the term of this patent is extended or adjusted under 35 U.S.C. 154(b) by 228 days.

(21) Appl. No.: 13/453,273

(22) Filed: Apr. 23, 2012

(65) Prior Publication Data

US 2013/0283254 A1 Oct. 24, 2013

(51) Int. Cl.
*G06F 9/445* (2006.01)
(52) U.S. Cl.
CPC .......................................... *G06F 8/65* (2013.01)
(58) Field of Classification Search
CPC ............... G06F 8/65; G06F 8/71; G06F 8/67; G06F 8/68; G06F 8/61
USPC .......................................................... 717/170
See application file for complete search history.

(56) References Cited

U.S. PATENT DOCUMENTS

| | | | | |
|---|---|---|---|---|
| 6,119,165 A * | 9/2000 | Li et al. | ........................... | 709/229 |
| 6,493,871 B1 * | 12/2002 | McGuire et al. | ............... | 717/173 |
| 6,718,549 B1 * | 4/2004 | Narin et al. | .................... | 717/178 |
| 7,600,225 B2 * | 10/2009 | Sliger et al. | ..................... | 717/169 |
| 2004/0215755 A1 * | 10/2004 | O'Neill | ........................... | 709/223 |
| 2005/0125489 A1 * | 6/2005 | Hanes | ............................. | 709/202 |
| 2006/0130046 A1 * | 6/2006 | O'Neill | ........................... | 717/168 |
| 2007/0169101 A1 * | 7/2007 | Konersmann et al. | ........ | 717/170 |
| 2008/0021984 A1 * | 1/2008 | Zarenin et al. | ................ | 709/220 |
| 2008/0052704 A1 * | 2/2008 | Wysocki | ......................... | 717/173 |
| 2008/0077662 A1 * | 3/2008 | Zarenin et al. | ................ | 709/203 |
| 2008/0127169 A1 * | 5/2008 | Malasky et al. | ................ | 717/174 |
| 2009/0249324 A1 * | 10/2009 | Brar et al. | ...................... | 717/173 |
| 2011/0296398 A1 * | 12/2011 | Vidal et al. | ..................... | 717/171 |
| 2013/0139139 A1 * | 5/2013 | Mallur et al. | .................. | 717/170 |
| 2013/0139183 A1 * | 5/2013 | Mallur et al. | .................. | 719/321 |

OTHER PUBLICATIONS

System Landscape Directory, located at http://scn.sap.com/docs/DOC-8042; Mar. 25, 2012.
Click Once (from Wikipedia), located at http://en.wikipedia.org/wiki/ClickOnce; last modified on Apr. 12, 2012.

(Continued)

*Primary Examiner* — Chameli Das
*Assistant Examiner* — Viva Miller
(74) *Attorney, Agent, or Firm* — Fountainhead Law Group PC (57) ABSTRACT

Embodiments include systems and methods for automated versioning of software on a client machine, allowing installation and updates over multiple platforms with modules written in different computer languages. In an embodiment, the client sends a list of installed modules to the server. This may be done by causing a client processor to perform method calls determining version information of the installed product. The server then checks the list and sends updates (if any) that are then automatically installed on the client. Some embodiments can perform software installation over-the-network, and prerequisite software may also be automatically installed on the client machine. The system may work on multiple platforms (e.g. Windows™, UNIX) and support multiple computer languages (e.g. C++, Java®, Python®, .NET, etc.).

11 Claims, 4 Drawing Sheets

(56) References Cited

OTHER PUBLICATIONS

How to Manually Install the Application Virtualization Client, located at http://technet.microsoft.com/en-us/library/cc817122(d=printer).aspx, Sep. 7, 2010.
Java SE Desktop Technologies, Oracle, located at http://www.oracle.com/technetwork/java/javase/tesch/index-jsp-136112.html. Printed Apr. 23, 2012.
Java Web Start Overview, Oracle, located at http://www.oracle.com/technetwork/java/javase/ovrview-137531.html. Printed Apr. 23, 2012.
Andre Van Der Hoek, Alexander L. Wolf, "Software Release Management for Componenet-based Software," Software-Practice and Experience, pp. 77-98, Published online Nov. 27, 2002.

* cited by examiner

METHOD AND ARCHITECTURE FOR AUTOMATIC INSTALLATION AND SELF-UPDATING OF CLIENT-SIDE COMPUTER SOFTWARE

BACKGROUND

Embodiments of the present invention relate to computing, and in particular, to a systems and methods for automated versioning of software on a client computer.

Unless otherwise indicated herein, the approaches described in this section are not prior art to the claims in this application and are not admitted to be prior art by inclusion in this section.

A client-server environment may operate smoothly based upon an implicit assumption that both the client and the server are operating using the same (or at least compatible) release versions of software. Failure to meet this criterion, however, can lead to various problems including program crashes and data corruption.

Usually, it is the server software that determines the version of the software that should be used. This is because the server typically performs the bulk of the processing chores. This is also because the software installed on the server often includes both server and client parts.

The present disclosure addresses these and other issues with systems and methods providing automatic installation and self-updating of client-side software.

SUMMARY

Embodiments include systems and methods for automated versioning of software on a client machine, allowing installation and updates over multiple platforms with modules written in different computer languages. In an embodiment, the client sends a list of installed modules to the server. This may be done by causing a client processor to perform method call(s) determining version information of the installed product. The server then checks the list and sends updates (if any) that are then automatically installed on the client. Some embodiments can perform software installation over-the-network, and prerequisite software may also be automatically installed on the client machine. The system may work on multiple platforms (e.g. Windows™, UNIX) and support multiple computer languages (e.g. C++, Java®, Python®, .NET, etc.).

An embodiment of a computer-implemented method comprises causing a processor of a computer to perform a method call determining a version information of a software product currently installed on the computer. The processor is caused to communicate the version information to a server computer. An updated version of the software product is communicated to the computer based upon the version information. The updated version of the software product is stored in a non-transitory computer readable storage medium of the computer. The updated version of the software product is caused to automatically be installed on the computer.

An embodiment of a non-transitory computer readable storage medium embodies a computer program for performing a method, said method comprising causing a processor of a computer to perform a method call determining a version information of a software product currently installed on the computer. The processor is caused to communicate the version information to a server computer. An updated version of the software product is communicated to the computer based upon the version information. The updated version of the software product is stored in a non-transitory computer readable storage medium of the computer. The updated version of the software product is caused to automatically be installed on the computer.

An embodiment of a computer system comprises one or more processors and a software program executable on said computer system, the software program configured to cause a processor of a computer to perform a method call determining a version information of a software product currently installed on the computer. The software program is further configured to cause the processor to communicate the version information to a server computer. An updated version of the software product is communicated to the computer based upon the version information. The updated version of the software product is stored in a non-transitory computer readable storage medium of the computer. The software program is configured to cause the updated version of the software product to automatically be installed on the computer.

In certain embodiments the computer comprises a client computer.

Embodiments may further comprise updating a map according to the updated version of the software product.

Embodiments may further comprise updating a manifest according to the updated version of the software product.

According to particular embodiments, the updated version of the software product is received from the server computer.

Embodiments may further comprise causing the currently installed version of the software product to continue to be stored in the computer.

Embodiments may further comprise causing prerequisite software to be communicated to the computer based upon the version information.

The following detailed description and accompanying drawings provide a better understanding of the nature and advantages of the present invention.

DETAILED DESCRIPTION

Described herein are techniques for automated versioning of software on a client. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
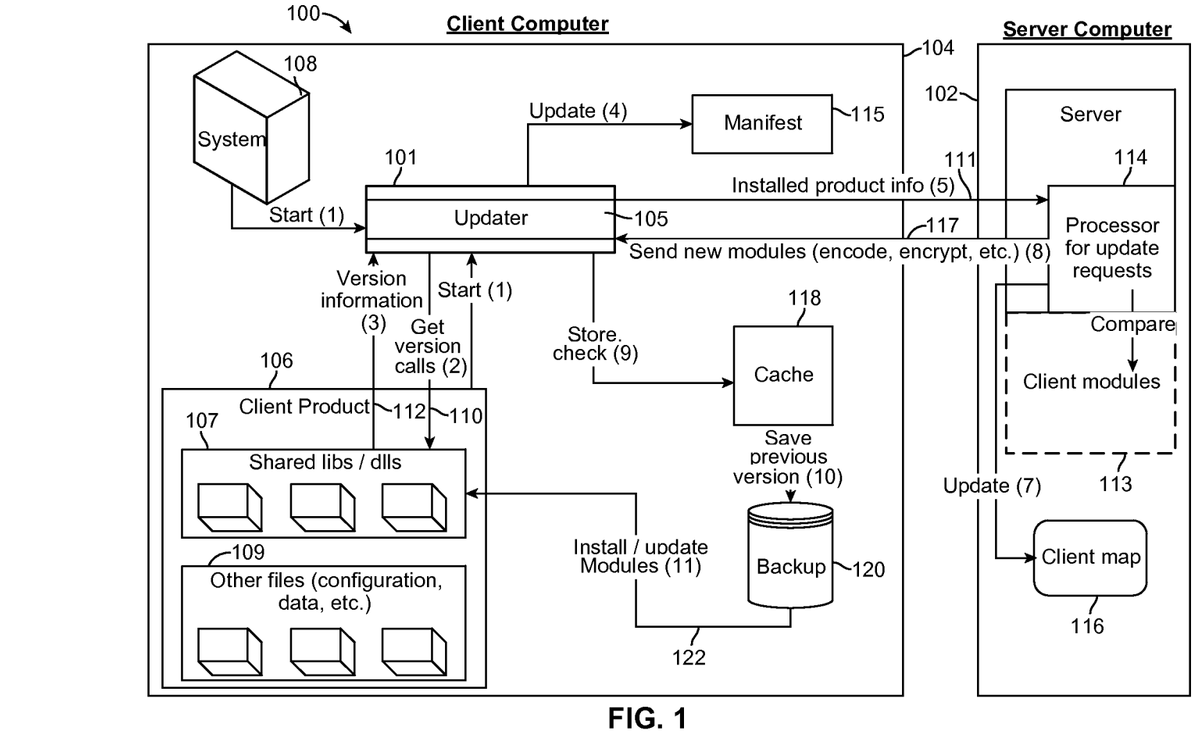
FIG. 1 shows a computer system according to an embodiment.
Figure 1A:
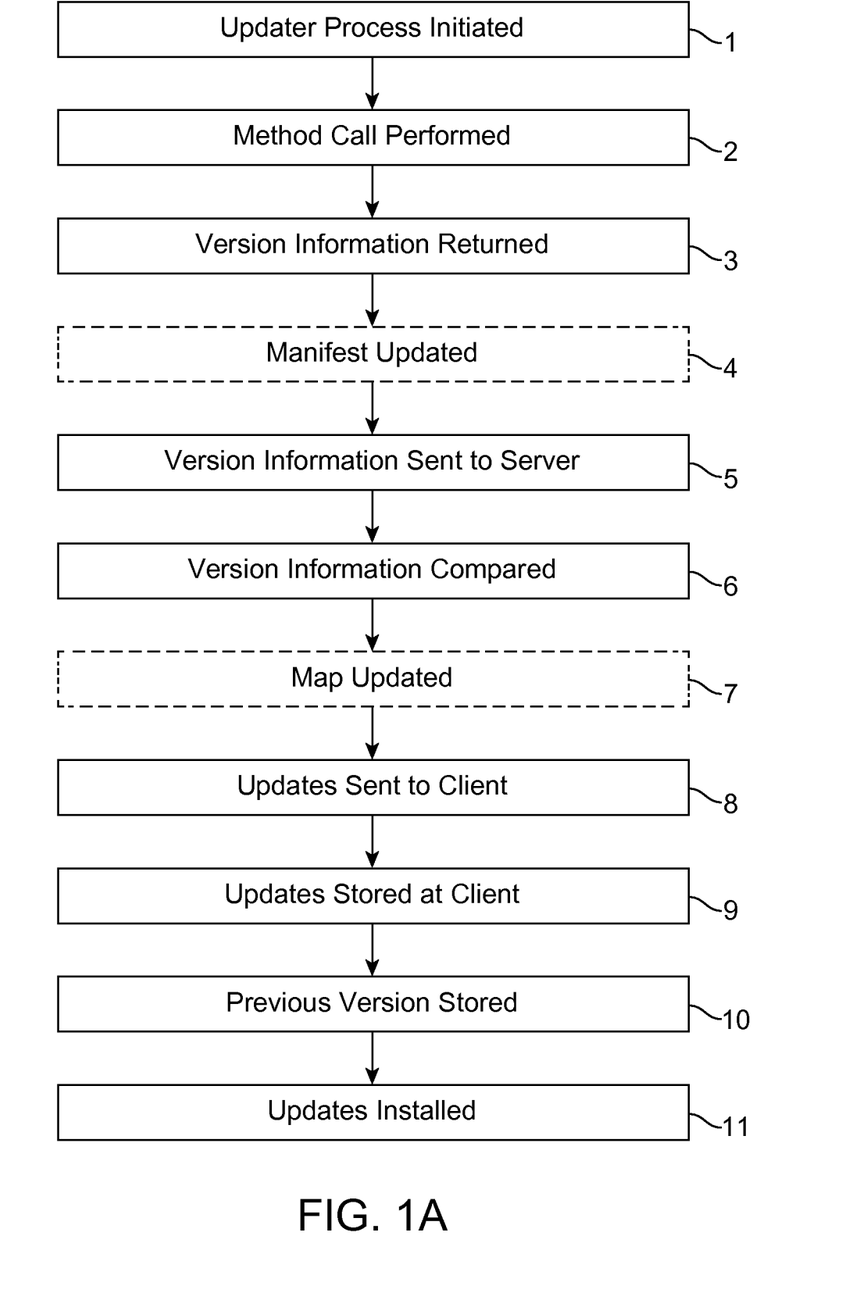
FIG. 1A is a simplified flow diagram showing method steps according to an embodiment.

FIG. 1 shows a computer system according to an embodiment. FIG. 1A is a simplified flow diagram showing steps of an automatic updating method according to an embodiment.

In particular, computer system 100 comprises a server-side computer 102 in communication with a client-side computer 104. The client-side computer 104 has installed thereon a software product 106 that is to be updated according to an embodiment. The software product 106 comprises shared libraries and dynamic link libraries (dlls) 107, as well as other files 109 storing configuration and data information.

According to various embodiments, a client processor 101 is caused to perform an updater process 105 wherein a method call determines a version of the software product currently installed on the client. Based upon the result of this method call, a list of installed modules is sent from the client to the server. The server then checks the list and sends updates (if any) to the software that is installed on the client. Upon receipt at the client, these updates are automatically installed.

As shown in step 1, in an embodiment the updater process 105 may be initiated by the software product 106 itself. Alternatively, the updater process may be initiated by a system 108 present on the client-side computer (e.g. by a Windows service or a UNIX daemon).

In a second step 2 the updater process 105 obtains a list of modules and dependencies, and makes method calls 110 to get version information from those modules. According to certain embodiments, the list can be retrieved by calling a method in the main module of product 106.

In certain embodiments, the list can take the form of a file. Such a file may be upgradable from the server. For example, an upgrade from a server may occur while receiving back the executables and other files as outlined below in steps 8-11.

In order to determine the existing version information of software in other components, the client processor 101 may be caused to call methods in those components. The following provide certain specific examples of how this may be done.

Examples: Windows—Specific:

An example of calling C# method from native C++ is as follows:

```
// Create the interface pointer
IVersionClassPtr version(__uuidof(VersionClass));
// Call the Get method.
version->Get(&currVersion);
```

Another way to execute a .NET assembly (such as VB.NET) from C++, is by hosting the Common Language Runtime (CLR), loading the assembly, and executing the desired method:

```
HRESULT hrExecute = pClrHost->ExecuteInDefaultAppDomain(
    assemblyPath, assemblyName,
    "GetVersion", args,
    &retVal);
```

Example: Python®

```
pModule = PyImport_Import(pName);
pDict = PyModule_GetDict(pModule);
pFunc = PyDict_GetItemString(pDict, "get_version");
pValue = PyObject_CallObject(pFunc, pArgs);
```

Example: JAVA®

The following illustrates calling JAVA® methods from C++ by using the JAVA® Native Interface (JNI):

```
// After creating a Java VM
jclass cls = env->FindClass("Main");
jmethodID mid = env->GetStaticMethodID(cls, "GetVersion", "(I)I");
newVersion = env->CallStaticIntMethod(cls, mid, oldVersion);
```

Returning to FIGS. 1-1A, in a third step 3 the version information 112 is returned from modules of the product. This version information may in the form of XML data.

Because the version number information is determined by method calls, metadata is not manually modified. This avoids issues associated with possible corruption of data and/or manual replacement of executables.

In addition where the list of dependencies (the manifest) is stored not in a file but in a database, conventional approaches comprising a set of libraries may be unable to integrate with the manifest owing to lack of an executable component. Embodiments avoid this issue by providing for the system to call the updater via a Windows service or UNIX daemon as discussed above.

In an optional fourth step 4, the updater process writes to a manifest file 115 comprising a list of installed products on the client-side computer. Depending upon the particular embodiment, a manifest file can be a flat file in a suitable format such as name-value pair list, XML, etc. Alternatively, the manifest can be stored in a database. In particular embodiments the manifest can comprise a SQLite database that keeps track of products installed on various client and server devices.

Thus according to certain embodiments, a bootstrapped installer/updater of a client computer may issue a call during initialization, determining in real-time the latest software version. The manifest can then (optionally) be updated with this information.

According to a fifth step 5 of FIGS. 1-1A, version information 111 of the software product installed on the client is communicated to the server. This version information may be in the form of XML data. According to particular embodiments, XML data may be sent to the server using a TCP/IP socket connection or another communication channel such as UDP, X.25, or others. In certain embodiments, XML data may be sent via a Web service call.

According to particular embodiments, the process of synchronization with a remote server or cloud can also redirect on alternative sites/URLs when the main one is not available. This may be done utilizing a routing mechanism that can be a list of prepared addresses and/or a Web service.

In a sixth step 6, an update processor 114 of the server-side computer receives the version information sent from the client. The update processor checks the file against a list of client side components 113 for the client computer's platform.

In an optional seventh step 7, the update processor on the server machine updates the map 116 of installed software for client machines. This allows the server to automatically create a list of client software modules installed on machines that connect to the server.

In an eighth step 8, if the version of the installed software product is to be updated, the server sends the appropriate updated components 117 back to the client computer. In certain embodiments this can be an incremental update. Prior to the transmission of the new module information outside of the server, techniques such as verification, authentication, authorization, encryption, and/or compression may be employed as appropriate.

In a ninth step 9, the updater process of the client computer verifies the received files, and stores them. This storage may be via a temporary directory in a cache memory 118, with the received files ultimately being stored on a hard drive in a separate directory.

The client verifies that the downloading process completed successfully, re-starting the process as necessary in case of an interrupted download or a system crash. Thus in a tenth step 10, the updater process also saves to a backup memory 120 the currently installed files that are being replaced. This makes a recovery/rollback possible in order to address installation errors.

In an eleventh step 11, the updater process installs/updates modules 122 in the product using the new stored files received from the server. The updater process then indicates completion of its work such that the updated version of the software product is ready to be used at the client. After this point, the previous version of the software that has been stored in the backup memory, may or may not be written over.

Methods according to certain embodiments may be employed for a traditional client-server system like DSOP (Data Services On-Premises). Methods according to other embodiments can be extended for on-demand/SaaS (Software as a System)/cloud computing architectures.

While the above embodiment has described encryption and/or encoding of the updated software information that is being communicated from the server to the client, other transmitted/stored data (e.g. from the client to the server) can optionally be encrypted and/or compressed. There can be pre- and post-installation platform-specific customization scripts with complex rules and expressions. There is also the ability to modify OS environmental variables.

While the particular embodiment of FIG. 1 shows the updated software version as being stored on the server, this is not required and certain embodiments can perform software installation over-the-network. For example, the client software could be downloaded from a list of trusted download sites.

And while FIG. 1 shows the installation of updated software versions in a client computer, embodiments are not limited to this. Alternative embodiments could also involve the automatic installation of prerequisite software on the client machine. Examples of such prerequisite software include but are not limited to the Java® Runtime Library from Oracle, the .Net Framework™ from Microsoft, and the C++ Runtime Library.

Furthermore, while the particular embodiment of FIG. 1 shows the automatic updating of software on a client-side computer by a server-side computer, this is not required. Alternative embodiments could perform the updating of server software from another server or URL(s).

According to some embodiments, the updating of one installed software product can trigger the upgrading of another installed software product. Moreover, the software to be downloaded can be distributed between multiple servers.

In certain embodiments, the auto-update process could be virtualized using the current file system and registry virtualization technologies. In some such embodiments, the private copy of a product may be updated without the need for administrative privileges.

In particular embodiments, the auto-updater can cache data shared by all installations of the product on the same machine. The updater can receive the updates from the server, store them, and then use to update multiple clients in a virtualized environment. According to certain embodiments, it is the received-from-server dlls/shared libraries that can be shared by all users. In some embodiments, the received-from-server dlls/shared libraries can be used to update multiple client installations without additional requests to the server.

Embodiments may offer various benefits. For example, certain embodiments may create a list of client software modules that are installed on machines connecting to the server. Moreover, multiple servers can also be linked together, thereby creating a comprehensive software map for the network.

Particular embodiments may also be capable of activation/deactivation on the client side. The updater process can also be pre-scheduled in advance.

Figure 2:
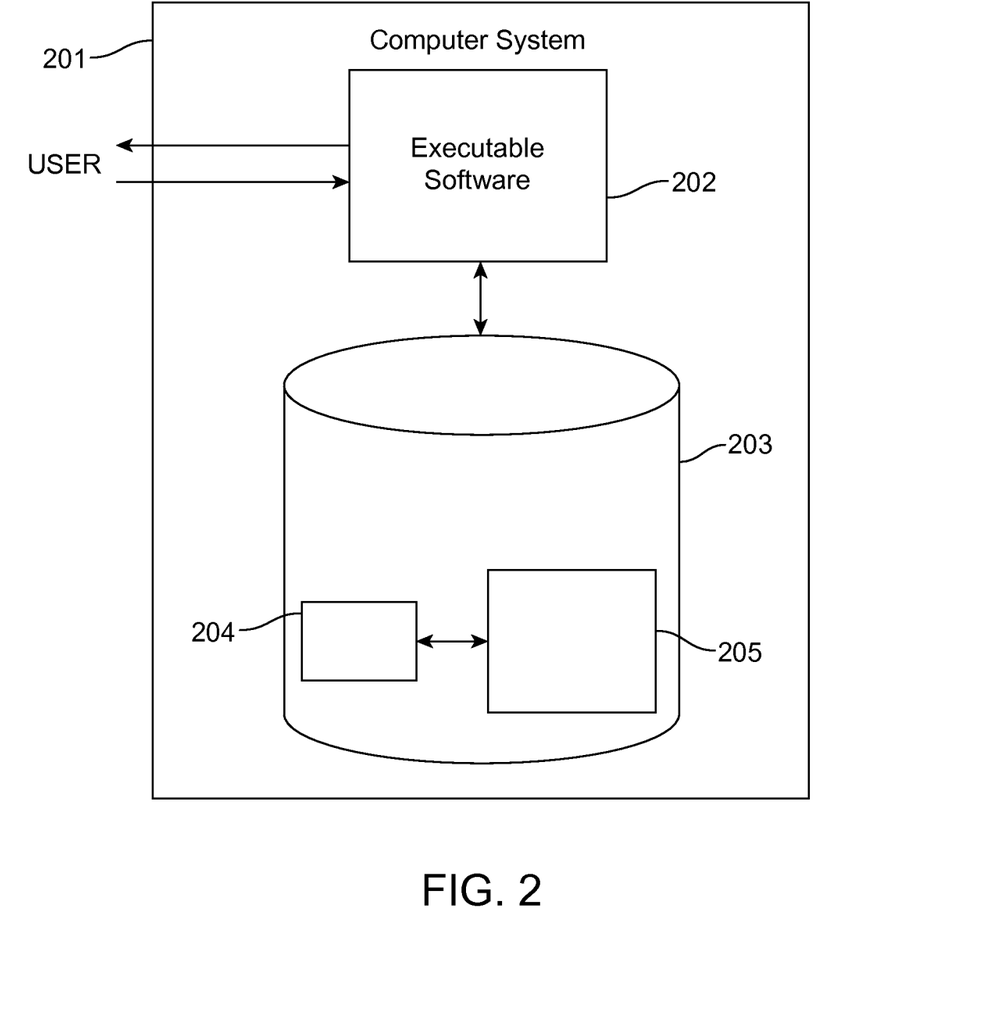
FIG. 2 illustrates hardware of a special purpose computing machine configured with an automatic updating process according to one embodiment.

FIG. 2 illustrates hardware of a special purpose computing machine configured to perform automatic client-side updating according to an embodiment. In particular, computer system 200 comprises a processor 202 that is in electronic communication with a non-transitory computer-readable storage medium 203. This computer-readable storage medium has stored thereon code 205 corresponding to various aspects of a software updater process. Code 204 corresponds to instructions for performing method call(s). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 3:
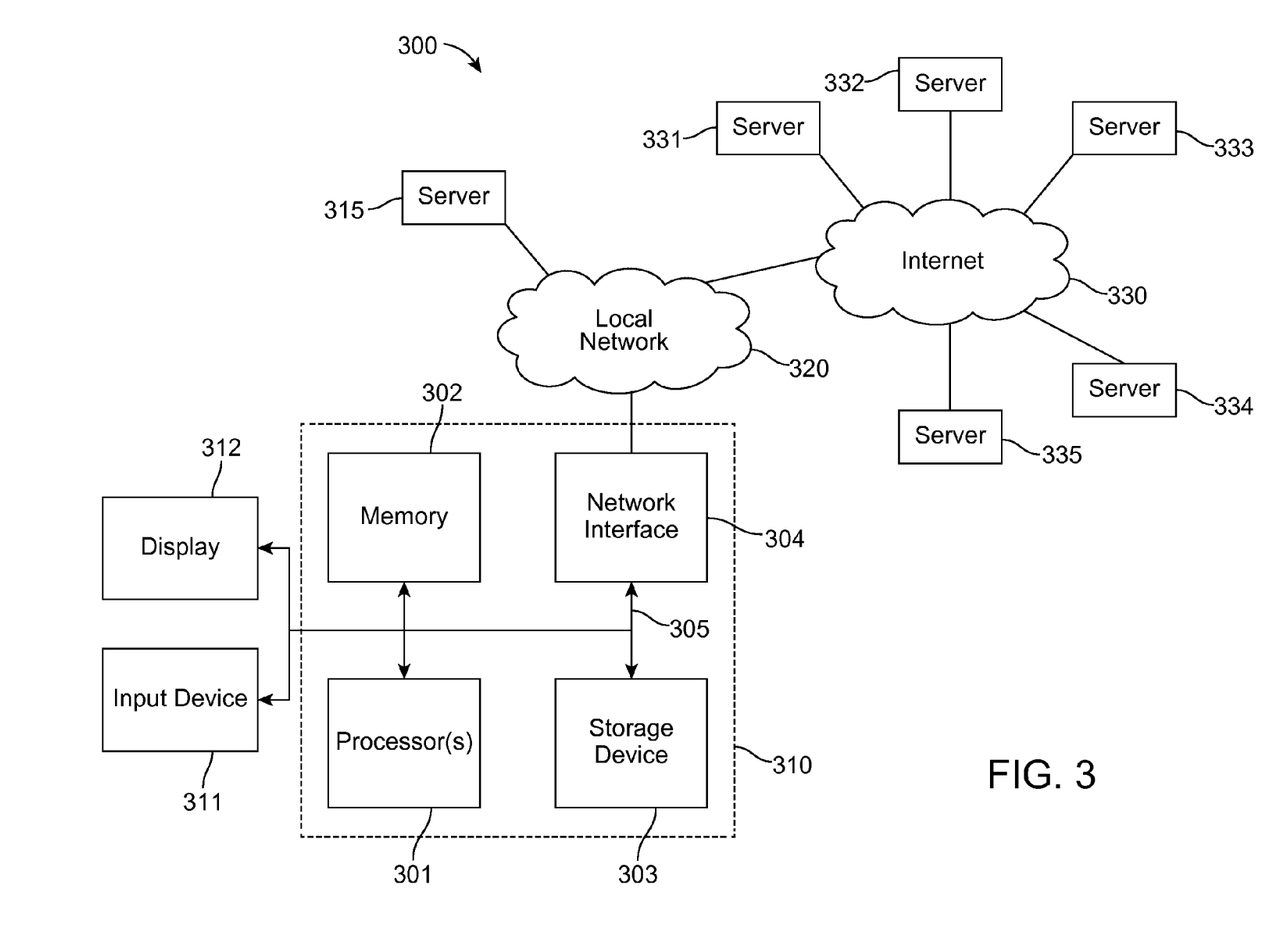
FIG. 3 illustrates an example of a computer system.

An example computer system 310 is illustrated in FIG. 3. Computer system 310 includes a bus 305 or other communication mechanism for communicating information, and a processor 301 coupled with bus 305 for processing information. Computer system 310 also includes a memory 302 coupled to bus 305 for storing information and instructions to be executed by processor 301, including information and instructions for performing the techniques described above, for example. This memory may also be used for storing variables or other intermediate information during execution of instructions to be executed by processor 301. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 303 may include source code, binary code, or software files for performing the techniques above, for example. Storage device and memory are both examples of computer readable mediums.

Computer system 310 may be coupled via bus 305 to a display 312, such as a cathode ray tube (CRT) or liquid crystal display (LCD), for displaying information to a computer user. An input device 311 such as a keyboard and/or mouse is coupled to bus 305 for communicating information and command selections from the user to processor 301. The combination of these components allows the user to communicate with the system. In some systems, bus 305 may be divided into multiple specialized buses.

Computer system 310 also includes a network interface 304 coupled with bus 305. Network interface 304 may provide two-way data communication between computer system 310 and the local network 320. The network interface 304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 304 sends and receives electrical, electromagnetic, or optical signals that carry digital data streams representing various types of information.

Computer system 310 can send and receive information, including messages or other interface actions, through the network interface 304 across a local network 320, an Intranet, or the Internet 330. For a local network, computer system 310 may communicate with a plurality of other computer machines, such as server 315. Accordingly, computer system 310 and server computer systems represented by server 315 may form a cloud computing network, which may be programmed with processes described herein. In the Internet example, software components or services may reside on multiple different computer systems 310 or servers 331-335 across the network. The processes described above may be implemented on one or more servers, for example. A server 331 may transmit actions or messages from one component, through Internet 330, local network 320, and network interface 304 to a component on computer system 310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
a Unix daemon on a system of a client computer initiating a processor of the client computer to perform method calls in multiple computer languages to shared runtime libraries and using a native interface, in order to determine a version information of a software product currently installed on a first virtual machine of the client computer, without reference to a manifest and without modifying metadata of the version information;
causing the processor to communicate the version information to a server computer;
causing the server computer to check the version information against a list of client-side components;
communicating an updated version of the software product to the client computer based upon comparison of the version information against the list;
storing the updated version of the software product in a non-transitory computer readable storage medium of the client computer;
causing the updated version of the software product to automatically be installed on the first virtual machine of the client computer; and
causing the updated version of the software product to automatically be installed on a second virtual machine accessing the shared runtime library without a request being sent to the server, wherein the processor is configured to cache data shared by the first virtual machine and the second virtual machine.

2. A method as in claim 1 further comprising updating a map according to the updated version of the software product.

3. A method as in claim 1 wherein the updated version of the software product is received from the server computer.

4. A method as in claim 1 further comprising causing prerequisite software to be communicated to the client computer based upon the version information.

5. A non-transitory computer readable storage medium embodying a computer program for performing a method, said method comprising:
a Unix daemon on a system of a client computer initiating a processor of the client computer to perform method calls in multiple computer languages to shared runtime libraries and using a native interface, in order to determine a version information of a software product currently installed on a first virtual machine of the client computer, without reference to a manifest and without modifying metadata of the version information;
causing the processor to communicate the version information to a server computer;
causing the server computer to check the version information against a list of client-side components;
communicating an updated version of the software product to the client computer based upon comparison of the version information against the list;
storing the updated version of the software product in a non-transitory computer readable storage medium of the client computer;
causing the updated version of the software product to automatically be installed on the client computer; and
causing the updated version of the software product to automatically be installed on a second virtual machine accessing the shared runtime library without a request being sent to the server, wherein the processor is configured to cache data shared by the first virtual machine and the second virtual machine.

6. A non-transitory computer readable storage medium as in claim 5 further comprising updating a map according to the updated version of the software product.

7. A non-transitory computer readable storage medium as in claim 5 wherein the updated version of the software product is received from the server computer.

8. A non-transitory computer readable storage medium as in claim 5 further comprising causing prerequisite software to be communicated to the client computer based upon the version information.

9. A computer system comprising:
one or more processors;
a software program, executable on said computer system, the software program configured to:
cause a Unix daemon on a system of a client computer to initiate a processor of the client computer to perform method calls in multiple computer languages to shared runtime libraries and using a native interface, in order to determine a version information of a software product currently installed on a first virtual machine of the client computer, without reference to a manifest and without modifying metadata of the version information;
cause the processor to communicate the version information to a server computer;
cause the server computer to check the version information against a list of client-side components;
communicate an updated version of the software product to the client computer based upon comparison of the version information against the list;
store the updated version of the software product in a non-transitory computer readable storage medium of the client computer;
cause the updated version of the software product to automatically be installed on the client computer; and cause the updated version of the software product to automatically be installed on a second virtual machine accessing the shared runtime library without a request being sent to the server, wherein the processor is configured to cache data shared by the first virtual machine and the second virtual machine.

10. A computer system as in claim 9 further comprising updating a map according to the updated version of the software product.

11. A computer system as in claim 9 wherein the updated version of the software product is received from the server computer.

* * * * *